(12) United States Patent
Miyahara et al.

(10) Patent No.: US 11,124,422 B2
(45) Date of Patent: Sep. 21, 2021

(54) ZEOLITE SYNTHESIS SOL, METHOD OF PRODUCING ZEOLITE MEMBRANE, AND METHOD OF PRODUCING ZEOLITE POWDER

(71) Applicant: NGK INSULATORS, LTD., Nagoya (JP)

(72) Inventors: Makoto Miyahara, Nagoya (JP); Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/794,807

(22) Filed: Feb. 19, 2020

(65) Prior Publication Data
US 2020/0283303 A1    Sep. 10, 2020

(30) Foreign Application Priority Data
Mar. 8, 2019    (JP) .............................. JP2019-043079

(51) Int. Cl.
| | | |
|---|---|---|
| *C01B 39/54* | (2006.01) | |
| *B01D 71/02* | (2006.01) | |
| *C01B 39/04* | (2006.01) | |
| *B01D 67/00* | (2006.01) | |

(52) U.S. Cl.
CPC .......... *C01B 39/54* (2013.01); *B01D 67/0051* (2013.01); *B01D 71/028* (2013.01); *C01B 39/04* (2013.01)

(58) Field of Classification Search
CPC .......... C01B 39/04; C01B 39/54; B01J 29/83; B01J 35/065; B01J 37/10; B01D 71/028
See application file for complete search history.

(56) References Cited

U.S. PATENT DOCUMENTS

2014/0360939 A1    12/2014    Yamada et al.

FOREIGN PATENT DOCUMENTS

| CN | 106672990 A | * | 5/2017 |
| JP | 3757110 B2 | | 3/2006 |
| JP | 6107809 B2 | | 4/2017 |

OTHER PUBLICATIONS

Chanda, "Zeolite/metal composite for adsorption heat pump devices: a direct crystallisation method for zeolite Faujisite on metallic aluminum", Dec. 20, 2018 (Year: 2018).*
Marhcese et al, "ALPO-34 and SAPO-34 synthesized by using morpholine as templating agent. FTIR and FT-Ramen studies of host-guest and guest-guest interactions within the zeolitic framework", Microporous and Mesoporous Materials 30 (1999) 145-153 (Year: 1999).*
Peng Tian et al., "Investigation of the Crystallization Process of SAPO-35 and Si Distribution in the Crystals," *The Journal of Physical Chemistry C*, ACS Publications, 2013, vol. 117, pp. 4048-4056 (in English).
Hidehiro Kamiya et al., "Dispersion Behavior Control of Nanoparticles and its Applications," *Micromeritics*, published by Hosokawa Micron Corporation No. 55, 2012, pp. 12-18 (in Japanese).

* cited by examiner

*Primary Examiner* — David M Brunsman
(74) *Attorney, Agent, or Firm* — Burr & Brown, PLLC (57) ABSTRACT

A zeolite synthesis sol includes particles of an aluminum source with a mean particle diameter of 5 to 500 nm, and a solvent in which the particles are dispersed, the solvent being water that contains a phosphorus source, a structure-directing agent, and a carboxylic acid.

7 Claims, 4 Drawing Sheets

ZEOLITE SYNTHESIS SOL, METHOD OF PRODUCING ZEOLITE MEMBRANE, AND METHOD OF PRODUCING ZEOLITE POWDER

This application claims priority benefit under 35 U.S.C. Section 119 of Japanese Patent Application No. 2019-043079 filed in the Japan Patent Office on Mar. 8, 2019, the entire disclosure of which is incorporated herein by reference.

TECHNICAL FIELD

The present invention relates to a zeolite synthesis sol, a method of producing a zeolite membrane, and a method of producing zeolite powder.

BACKGROUND ART

Zeolite has conventionally been synthesized through hydrothermal synthesis. For example, according to "Investigation of the Crystallization Process of SAPO-35 and Si Distribution in the Crystals" by Peng TIAN and other eight members, Journal of Physical Chemistry, ACS Publications, 2013, volume 117, pages 4048-4056 (Document 1), zeolite containing aluminum and phosphorus (i.e., aluminophosphate-based zeolite) is synthesized through hydrothermal synthesis while stirring a gel containing an aluminum source and a phosphorus source.

The publication of Japanese Patent No. 6107809 (Document 2) exemplifies cations derived from 1-adamantanamine as a structure-directing agent (organic template) for the crystallization of zeolite, and describes that these cations are accompanied by anions such as carboxylate anions. The publication of Japanese Patent No. 3757110 (Document 3) discloses a sol in which particles of a source material for forming a zeolite membrane are dispersed, the sol being rich in particles with particle diameters of 1 nm to 500 nm. Although not related to the synthesis of zeolite, "Dispersion Behavior Control of Nanoparticles and its Applications" by Hidehiro KAMIYA and another one member, the Micromeritics, No. 55, 2012, pages 12-18, published by Hosokawa Micron Corporation describes a dispersant having carboxylic acid groups.

Incidentally, in the case of preparing a zeolite synthesis sol (a sol for zeolite synthesis) in which particles of an aluminum source are dispersed in a solvent containing a phosphorus source in order to synthesize zeolite containing aluminum and phosphorus, the particles of the aluminum source agglomerate and settle out. As a result, it becomes unable to produce a zeolite membrane with a uniform thickness or zeolite powder with a uniform particle diameter. Although it is possible to stir the synthesis sol as in Document 1 described above, in this case it becomes difficult to form a zeolite membrane on a large-sized support. Thus, there is demand for a zeolite synthesis sol in which particles of an aluminum source are appropriately dispersed in a solvent containing a phosphorus source. Note that Documents 2 and 3 described above do not have the above-described problem, i.e., the agglomeration of particles of an aluminum source in a solvent containing a phosphorus source, because the zeolite synthesis sols do not contain phosphorus sources.

SUMMARY OF INVENTION

The present invention is intended for a zeolite synthesis sol, and it is an object of the present invention to provide a zeolite synthesis sol in which particles of an aluminum source are appropriately dispersed in a solvent containing a phosphorus source.

The zeolite synthesis sol according to a preferred embodiment of the present invention includes particles of an aluminum source with a mean particle diameter of 5 to 500 nm, and a solvent in which the particles are dispersed, the solvent being water that contains a phosphorus source, a structure-directing agent, and a carboxylic acid.

Accordingly, it is possible to provide the zeolite synthesis sol in which the particles of the aluminum source are appropriately dispersed in the solvent containing the phosphorus source. As a result, either a zeolite membrane with a uniform thickness or zeolite powder with a uniform particle diameter, both containing aluminum and phosphorus, can be easily produced.

Preferably, the zeolite synthesis sol has a phosphorus/aluminum molar ratio of 0.8 to 4.

Preferably, the zeolite synthesis sol has a pH of 4 to 11.

Preferably, the zeolite synthesis sol has a carboxylic acid/aluminum molar ratio of 0.01 to 3.

The present invention is also intended for a method of producing a zeolite membrane. The method of producing a zeolite membrane according to a preferred embodiment of the present invention includes preparing the above-described zeolite synthesis sol, and forming a zeolite membrane on a support through hydrothermal synthesis using the zeolite synthesis sol.

The present invention is also intended for a method of producing zeolite powder. The method of producing zeolite powder according to a preferred embodiment of the present invention includes preparing the above-described zeolite synthesis sol, and forming zeolite powder through hydrothermal synthesis using the zeolite synthesis sol.

With the above-described method of producing a zeolite membrane, it is possible to easily produce a zeolite membrane that contains aluminum and phosphorus and has a uniform thickness. With the above-described method of producing zeolite powder, it is possible to easily produce zeolite powder that contains aluminum and phosphorus and has a uniform particle diameter.

These and other objects, features, aspects and advantages of the present invention will become more apparent from the following detailed description of the present invention when taken in conjunction with the accompanying drawings.

DESCRIPTION OF EMBODIMENTS

Figure 1:
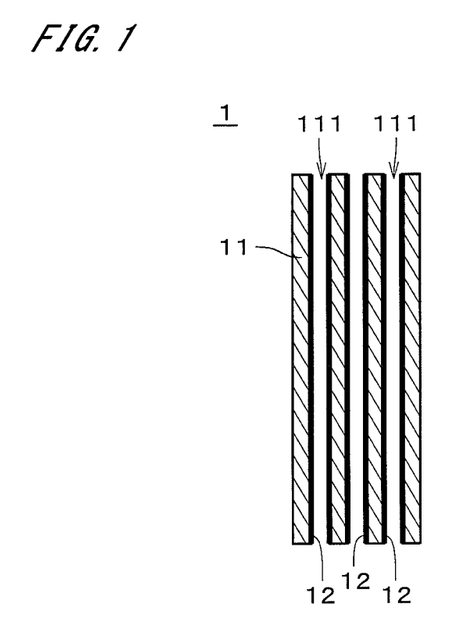
FIG. 1 is a sectional view of a zeolite membrane complex.
Figure 2:
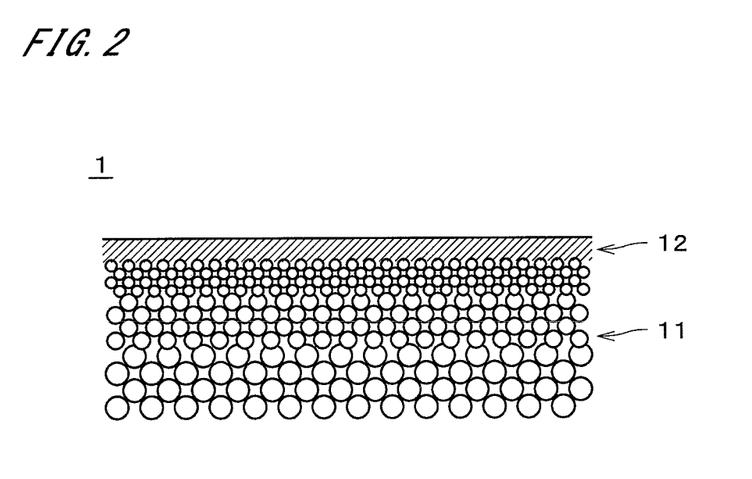
FIG. 2 is a sectional view illustrating part of the zeolite membrane complex in enlarged dimension.

FIG. 1 is a sectional view of a zeolite membrane complex 1. FIG. 2 is a sectional view illustrating part of the zeolite membrane complex 1 in enlarged dimension. The zeolite membrane complex 1 includes a porous support 11 and a zeolite membrane 12 formed on the support 11. The zeolite membrane refers to at least zeolite that is formed into a membrane on a surface of the support 11, and does not include zeolite particles that are merely dispersed in an organic membrane. In FIG. 1, the zeolite membrane 12 is illustrated with a bold line. In FIG. 2, the zeolite membrane 12 is cross-hatched. In FIG. 2, the zeolite membrane 12 is also illustrated thicker than the actual one.

The support 11 is a porous member permeable to gases and liquids. In the example illustrated in FIG. 1, the support 11 is a monolith support obtained by forming a plurality of through holes 111, each extending in a longitudinal direction (i.e., an up-down direction in FIG. 1), in an integrally-molded integral columnar body. In the example illustrated in FIG. 1, the support 11 has a substantially circular columnar shape. For example, each through hole 111 (i.e., cell) has a substantially circular section perpendicular to the longitudinal direction. In FIG. 1, the diameter of the through holes 111 is illustrated greater than the actual diameter, and the number of through holes 111 is illustrated smaller than the actual number. The zeolite membrane 12 is formed on the inner surfaces of the through holes 111 and cover substantially the entire inner surfaces of the through holes 111.

The length of the support 11 (i.e., length in the up-down direction in FIG. 1) is in the range of, for example, 10 cm to 200 cm. The outer diameter of the support 11 is in the range of, for example, 0.5 cm to 30 cm. The distance between the central axes of each pair of adjacent through holes 111 is in the range of, for example, 0.3 mm to 10 mm. The surface roughness (Ra) of the support 11 is in the range of, for example, 0.1 µm to 5.0 µm and preferably in the range of 0.2 µm to 2.0 µm. Note that the support 11 may have a different shape such as a honeycomb shape, a flat plate shape, a tubular shape, a circular cylindrical shape, a circular columnar shape, or a polygonal prism shape. In the case where the support 11 has a tubular shape or a circular cylindrical shape, the thickness of the support 11 is, for example, in the range of 0.1 mm to 10 mm.

Various substances (e.g., a ceramic or a metal) can be employed as the material for the support 11 as long as they have chemical stability during the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttria, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

For example, the mean pore diameter of the support 11 is in the range of 0.01 µm to 70 µm and preferably in the range of 0.05 µm to 25 µm. The mean pore diameter of a portion of the support 11 that is located in the vicinity of the surface where the zeolite membrane 12 is formed is in the range of 0.01 µm to 1 µm and preferably in the range of 0.05 µm to 0.5 µm. As to the pore size distribution of the support 11 as a whole including the surface and interior of the support 11, D5 is in the range of, for example, 0.01 µm to 50 µm, D50 is in the range of, for example, 0.05 µm to 70 µm, and D95 is in the range of, for example, 0.1 µm to 2000 µm. The porosity of the portion of the support 11 that is located in the vicinity of the surface where the zeolite membrane 12 is formed is in the range of, for example, 25% to 50%.

For example, the support 11 has a multilayer structure in which a plurality of layers having different mean pore diameters are laminated one above another in a thickness direction. The mean pore diameter and sintered particle diameter of an outer surface layer that includes the surface where the zeolite membrane 12 is formed are smaller than the mean pore diameters and sintered particle diameters of layers other than the outer surface layer. The mean pore diameter of the outer surface layer of the support 11 is in the range of, for example, 0.01 µm to 1 µm and preferably in the range of 0.05 µm to 0.5 µm. When the support 11 has a multilayer structure, the material for each layer may be any of the materials described above. The materials for the plurality of layers, which form the multilayer structure, may be the same material, or may be different materials.

The zeolite membrane 12 is a porous membrane with pores. The zeolite membrane 12 can be used as a separator membrane that uses a molecular sieving function to separate a specific substance from a mixture of substances, the mixture of substances being obtained by mixing a plurality of types of substances. The zeolite membrane 12 is less permeable to other substances than to the specific substance. In other words, the permeation amounts of the other substances through the zeolite membrane 12 are smaller than the permeation amount of the aforementioned specific substance.

The thickness of the zeolite membrane 12 is in the range of, for example, 0.05 µm to 30 µm, preferably in the range of 0.1 µm to 20 µm, and more preferably in the range of 0.5 µm to 10 µm. The separation performance improves as the thickness of the zeolite membrane 12 increases. The permeation rate increases as the thickness of the zeolite membrane 12 decreases. In the production of the zeolite membrane 12 using a later-described zeolite synthesis sol, the generation of defects, i.e., locally thin or thick portions, can be suppressed because the thickness of the zeolite membrane 12 can be made uniform. The surface roughness (Ra) of the zeolite membrane 12 is, for example, less than or equal to 5 µm, preferably less than or equal to 2 µm, more preferably less than or equal to 1 µm, and yet more preferably less than or equal to 0.5 µm.

The mean pore diameter of the zeolite membrane 12 is, for example, less than or equal to 1 nm. The mean pore diameter of the zeolite membrane 12 is preferably greater than or equal to 0.2 nm and less than or equal to 0.8 nm, more preferably greater than or equal to 0.3 nm and less than or equal to 0.5 nm, and yet more preferably, greater than or equal to 0.3 nm and less than or equal to 0.4 nm. The mean pore diameter of the zeolite membrane 12 is smaller than the mean pore diameter of the portion of the support 11 that is located in the vicinity of the surface where the zeolite membrane 12 is formed.

If n is the maximum number of members in the ring of zeolite that makes up the zeolite membrane 12, the mean pore diameter is an arithmetic mean of the major and minor axes of n-membered ring pores. The n-membered ring pore refer to a pore in which n oxygen atoms exist in a portion where oxygen atoms and T atoms are bonded together and form a ring structure. If zeolite has a plurality of n-membered ring pores where n is the same number, the mean pore diameter of the zeolite is an arithmetic mean of the major and minor axes of all the n-membered ring pores. In this way, the mean pore diameter of the zeolite membrane is uniquely determined by the framework structure of the zeolite and obtained from the values presented in the "Database of Zeolite Structures," [online] by the International Zeolite Association on the Internet (URL: http://www.iza-structure.org/databases/).

The type of the zeolite, which makes up the zeolite membrane 12, is not particularly limited, and may be any type of zeolite, including AEI type, AEN type, AFN type, AFV type, AFX type, BEA type, CHA type, DDR type, ERI type, ETL type, FAU type (X type, Y type), GIS type, LEV type, LTA type, MEL type, MFI type, MOR type, PAU type, RHO type, SAT type, and SOD type.

The zeolite membrane 12 contains at least aluminum (Al) and phosphorus (P). The zeolite making up the zeolite membrane 12 may, for example, be ALPO-type zeolite in which atoms (T atoms) located in the center of an oxygen tetrahedron ($TO_4$) of zeolite are composed of Al and P; SAPO-type zeolite in which T atoms are composed of silicon (Si), Al, and P; MAPSO-type zeolite in which T atoms are composed of magnesium (Mg), Si, Al, and P; or ZnAPSO-type zeolite in which T atoms are composed of zinc (Zn), Si, Al, and P. Some of the T atoms may be replaced by other elements.

The phosphorus/aluminum molar ratio (i.e., value obtained by dividing the number of moles of phosphorus by the number of moles of aluminum; the same applies below) in the zeolite membrane 12 is preferably in the range of 0.4 to 3, more preferably in the range of 0.5 to 2, and yet more preferably in the range of 0.7 to 1.5. The phosphorus/aluminum ratio in the zeolite membrane 12 can be adjusted by adjusting, for example, the composition ratio of the aluminum source and the phosphorus source in the later-described zeolite synthesis sol (the same applies to the ratio of other elements). The zeolite membrane 12 may contain alkali metals. Examples of the alkali metals include sodium (Na) and potassium (K).

From the viewpoint of increasing the $CO_2$ permeation rate and improving the separation performance, the maximum number of members in the ring of the zeolite is preferably less than or equal to 8 (e.g., 6 or 8). The zeolite membrane 12 is composed of, for example, SAT-type zeolite. In other words, the zeolite membrane 12 is composed of zeolite having a framework type code "SAT" assigned by the International Zeolite Association. In this case, the intrinsic pore diameter of the zeolite making up the zeolite membrane 12 is 0.30 nm×0.55 nm, and the mean pore diameter thereof is 0.43 nm.

The $CO_2$ permeation rate (permeance) of the zeolite membrane 12 at temperatures of 20° C. to 400° C. is, for example, greater than or equal to 100 nmol/m²·s·Pa. The ratio (permeance ratio) of the $CO_2$ permeation rate and the $CH_4$ leak rate of the zeolite membrane 12 at temperatures of 20° C. to 400° C. is, for example, higher than or equal to 100. The permeance and the permeance ratio are those for the case where a difference in the partial pressure of $CO_2$ between the supply and permeation sides of the zeolite membrane 12 is 1.5 MPa.

Figure 3:
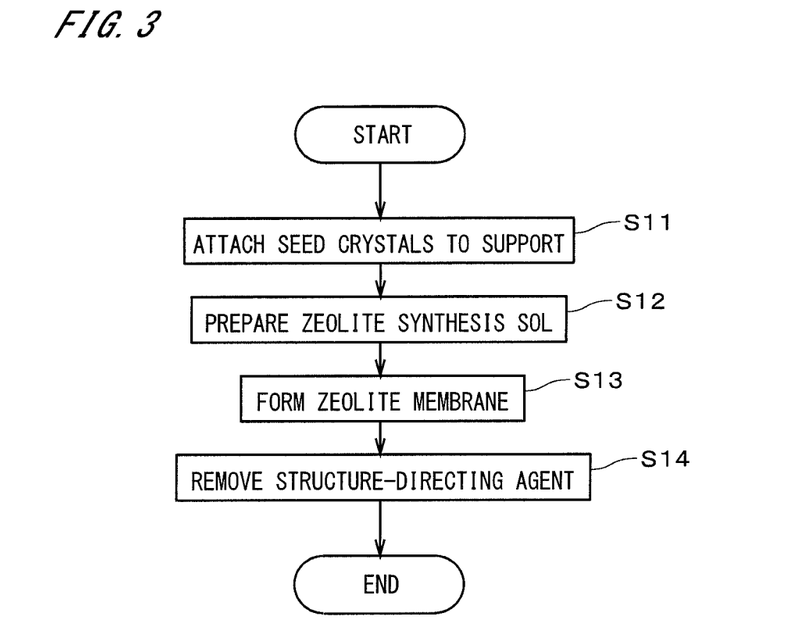
FIG. 3 is a flowchart of production of the zeolite membrane complex.

Next, an example of the procedure for producing the zeolite membrane complex 1 will be described with reference to FIG. 3. The production of the zeolite membrane complex 1 in FIG. 3 is also the production of the zeolite membrane 12. In the production of the zeolite membrane complex 1, first, seed crystals used in the production of the zeolite membrane 12 are prepared. For example, SAT-type zeolite powder is synthesized through hydrothermal synthesis, and seed crystals are acquired from the zeolite powder. The zeolite powder may be used as-is as seed crystals, or may be subjected to processing such as pulverization to acquire seed crystals.

Then, the porous support 11 is immersed in a solution in which the seed crystals are dispersed, in order to attach the seed crystals to the support 11 (step S11). Alternatively, the seed crystals may be attached to the support 11 by bringing a solution in which the seed crystals are dispersed into contact with a portion of the support 11 on which the zeolite membrane 12 is desired to be formed. In this way, a seed crystal attachment support is prepared. The seed crystals may be attached by other methods to the support 11.

Figure 4:
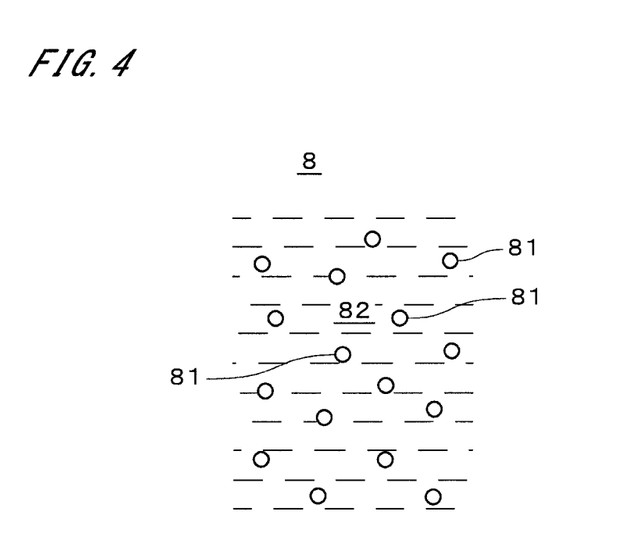
FIG. 4 schematically illustrates a zeolite synthesis sol.

Meanwhile, a zeolite synthesis sol 8 schematically illustrated in FIG. 4 is prepared (step S12). The zeolite synthesis sol 8 is a raw material solution and includes particles 81 of an aluminum source and a solvent 82 in which the particles 81 are dispersed. The mean particle diameter of the particles 81 is in the range of 5 nm to 500 nm. From the viewpoint of facilitating the handling of the particles 81 of the aluminum source, the mean particle diameter of the particles 81 is preferably greater than or equal to 5 nm and more preferably greater than or equal to 10 nm. In order to improve the reactivity of the zeolite synthesis sol 8, the mean particle diameter of the particles 81 is preferably less than or equal to 200 nm and more preferably less than or equal to 100 nm. The mean particle diameter of the particles 81 is a median diameter (D50) in the particle-size distribution obtained by a laser-scattering method. The particles 81 of the aluminum source are particles of, for example, crystalline alumina, amorphous alumina, boehmite, pseudoboehmite, or aluminum hydroxide.

The solvent 82 serving as a dispersion medium is water that contains a phosphorus source, a structure-directing agent (hereinafter, also referred to as an "SDA"), and a carboxylic acid. In the zeolite synthesis sol 8, the phosphorus source, the SDA, and the carboxylic acid are dissolved in water. For example, a phosphoric acid or aluminum phosphate is used as the phosphorus source. As the SDA, amines or quaternary ammonium salt are usually used. As the SDA, for example, hydroxylated 1,4-diazabicyclo[2.2.2]octane-C4-diquat can be used for SAT-type zeolite, tetraethylammonium hydroxide (TEAOH) can be used for AEI-type zeolite, and N,N,N,N'-tetramethyl-1,6-diamino-hexane (TMHD) can be used for AFX-type zeolite. As the carboxylic acid, for example, a lactic acid, a malic acid, or a citric acid can be used. In the zeolite synthesis sol 8 containing the carboxylic acid, the particles 81 of the aluminum source having a mean particle diameter of 500 nm or less are appropriately dispersed in the solvent 82 containing the phosphorus source. This inhibits the particles 81 from settling out. This also suppresses gelation of the zeolite synthesis sol 8. The pH of the zeolite synthesis sol 8 is preferably in the range of 4 to 11, more preferably in the range of 5 to 10, and yet more preferably in the range of 6 to 9.

In the zeolite synthesis sol 8, gelation may be caused due to heating, and in order to suppress the gelation (i.e., maintain dispersibility), the phosphorus/aluminum molar ratio is preferably in the range of 0.8 to 4, more preferably in the range of 0.9 to 3.5, and yet more preferably in the range of 1 to 3. Although the reason that the gelation is suppressed within the above-described range of the phosphorus/aluminum molar ratio is unclear, it is conceivable that gelation caused by heating is more likely to be suppressed when the above molar ratio in the zeolite synthesis sol 8 is close to the phosphorus/aluminum molar ratio in monobasic aluminum phosphate ($Al(H_2PO_4)_3$), which is a highly dispersed sol.

The carboxylic acid/aluminum molar ratio in the zeolite synthesis sol 8 is preferably in the range of 0.01 to 3, more preferably in the range of 0.1 to 2, and yet more preferably in the range of 0.2 to 1. This reliably improves dispersibility of the particles 81 of the aluminum source. The composition of the zeolite synthesis sol 8 is, for example, $1Al_2O_3:1P_2O_5: 0.8SDA:200H_2O:0.1C_6H_8O_7$. The zeolite synthesis sol 8 may contain other sources such as a silicon source, a magnesium source, and a zinc source.

The support 11 with the seed crystals attached thereon is immersed in the zeolite synthesis sol 8. Then, the zeolite is grown through hydrothermal synthesis using the seed crystals as nuclei so as to form the zeolite membrane 12 on the support 11 (step S13). The zeolite membrane 12 is composed of, for example, SAT-type zeolite. The temperature at the time of the hydrothermal synthesis is in the range of, for example, 120 to 200° C. The hydrothermal synthesis time is in the range of, for example, 5 to 50 hours. As described previously, the particles 81 of the aluminum source are favorably dispersed in the solvent 82 in the zeolite synthesis sol 8, so that the zeolite will grow uniformly in approximately all the seed crystals attached to the support 11.

When the hydrothermal synthesis ends, the support 11 and the zeolite membrane 12 are cleaned with deionized water. After the cleaning, the support 11 and the zeolite membrane 12 are dried at, for example, 100° C. After the drying of the support 11 and the zeolite membrane 12, the zeolite membrane 12 is subjected to heat treatment in an oxidizing gas atmosphere in order to burn and remove the SDA in the zeolite membrane 12 (step S14). This allows the micropores in the zeolite membrane 12 to come through. Preferably, the SDA is removed substantially completely. The heating temperature at the time of the removal of the SDA is in the range of, for example, 300 to 700° C. The heating time is in the range of, for example, 5 to 200 hours. The oxidizing gas atmosphere is an atmosphere containing oxygen, e.g., in the air.

Through the above-described processing, the zeolite membrane complex 1 is obtained. In the production of the zeolite membrane 12 using the zeolite synthesis sol 8, it is possible to easily obtain the zeolite membrane 12 containing aluminum and phosphorus and having a uniform thickness. Therefore, even in the case of reducing the thickness of the zeolite membrane 12, it is possible to suppress the occurrence of defects. In the zeolite synthesis sol 8, it is possible to favorably disperse the particles 81 of the aluminum source without stirring. Accordingly, it is easy to realize the formation of the zeolite membrane 12 on the large-sized support 11.

Next, examples of the production of the zeolite synthesis sol 8 and the zeolite membrane 12 will be described.

Example 1

SAT-Type Zeolite Synthesis Sol

A zeolite synthesis sol (raw material solution) with a composition of $1Al_2O_3:1P_2O_5:0.8SDA:200H_2O:0.1C_6H_8O_7$ was prepared by dissolving (mixing) in deionized water an amorphous alumina sol, an 85% phosphoric acid, hydroxylated 1,4-diazabicyclo[2.2.2]octane-C4-diquat, and a citric acid, which served respectively as the aluminum source, the phosphorus source, the structure-directing agent (SDA), and the carboxylic acid. The mean particle diameter of particles contained in the zeolite synthesis sol, measured by a laser-scattering method, was 50 nm.

Example 2

AEI-Type Zeolite Synthesis Sol

A zeolite synthesis sol (raw material solution) with a composition of $1Al_2O_3:3P_2O_5:0.8SDA:300H_2O:0.01C_4H_6O_5$ was prepared by dissolving (mixing) in deionized water an amorphous alumina sol, a 85% phosphoric acid, tetraethylammonium hydroxide (TEAOH), and a malic acid, which served respectively as the aluminum source, the phosphorus source, the structure-directing agent (SDA), and the carboxylic acid. The mean particle diameter of particles contained in the zeolite synthesis sol, measured by a laser-scattering method, was 10 nm.

Example 3

AFX-Type Zeolite Synthesis Sol

A zeolite synthesis sol (raw material solution) with a composition of $1Al_2O_3:2P_2O_5:0.3SiO_2:0.8SDA:100H_2O:1C_3H_6O_3$ was prepared by dissolving (mixing) in deionized water an amorphous alumina sol, a 85% phosphoric acid, a silica sol, N,N,N',N'-tetramethyl-1,6-diamino-hexane (TMHD), and a lactic acid, which served respectively as the aluminum source, the phosphorus source, the silicon source, the structure-directing agent (SDA), and the carboxylic acid. The mean particle diameter of particles contained in the zeolite synthesis sol, measured by a laser-scattering method, was 20 nm.

A porous support with seed crystals attached thereon in advance was immersed in each of the above-described zeolite synthesis sols and subjected to 50-hour hydrothermal synthesis at 170° C. The supports were then cleaned enough with deionized water and dried completely at 100° C. As a result of measuring the $N_2$ permeation rates, dense zeolite membranes with $N_2$ permeation rates of 0.001 L/min·m²·kPa or less were obtained in all of the above examples. The membrane thicknesses were also measured by SEM observations, which showed that uniform membranes had been obtained in each of which the values of thickness at 10 locations fell within plus or minus 20% of the mean value.

Figure 5:
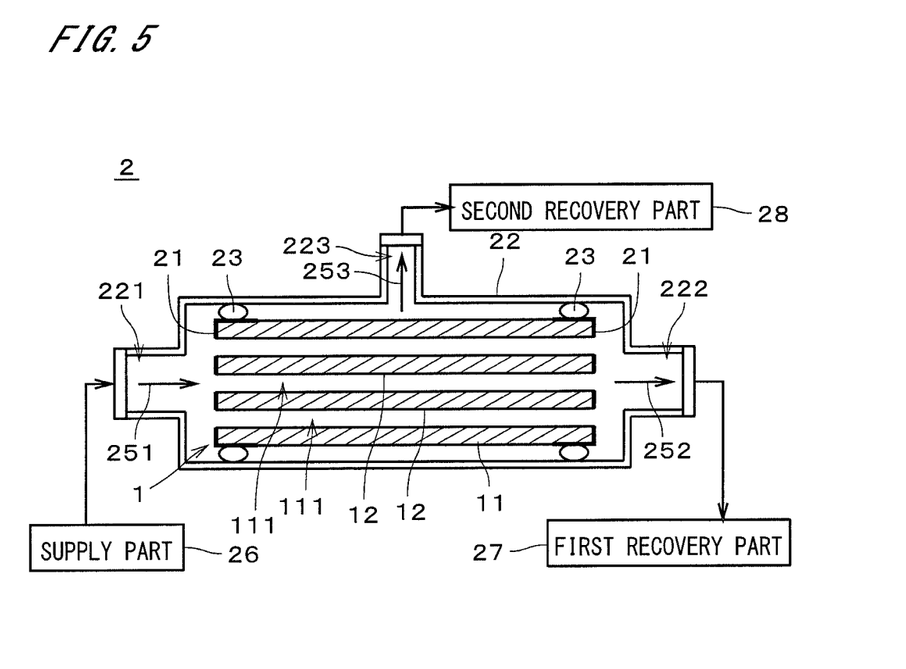
FIG. 5 illustrates a separation apparatus.
Figure 6:
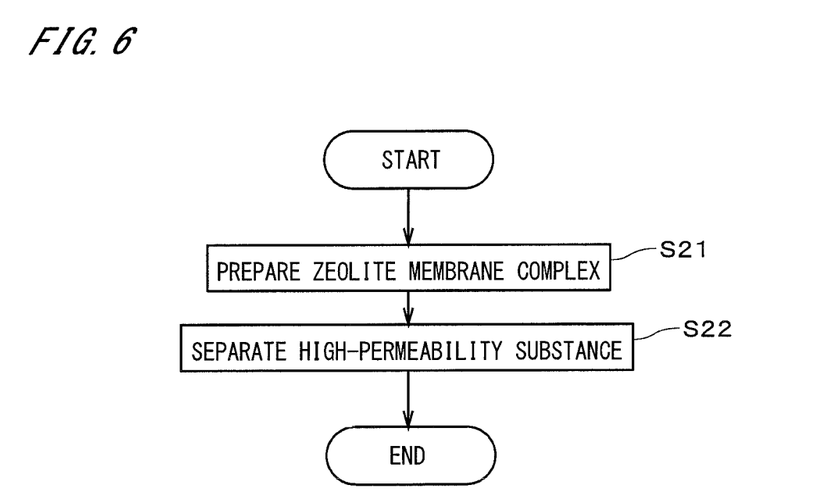
FIG. 6 is a flowchart of separation of a mixture of substances by the separation apparatus.

Next, the separation of the mixture of substances using the zeolite membrane complex 1 will be described with reference to FIGS. 5 and 6. FIG. 5 illustrates a separation apparatus 2. FIG. 6 is flowchart of the separation of the mixture of substances by the separation apparatus 2.

The separation apparatus 2 supplies a mixture of substances including a plurality of types of fluids (i.e., gases or liquids) to the zeolite membrane complex 1 and allows a substance with high permeability in the mixture of substances to pass through the zeolite membrane complex 1 so as to separate the substance from the mixture of substances. The separation by the separation apparatus 2 may be performed for the purpose of, for example, extracting a substance with high permeability from the mixture of substances or for the purpose of condensing a substance with low permeability.

The mixture of substances (i.e., a mixture of fluids) may be a mixed gas including a plurality of types of gases, or may be a mixed liquid including a plurality of types of liquids, or may be a gas-liquid two-phase fluid including both gas and liquid.

The mixture of substances includes, for example, one or more types of substances including hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acids, alcohol, mercaptans, ester, ether, ketone, and aldehyde.

Nitrogen oxides are compounds of nitrogen and oxygen. The aforementioned nitrogen oxides are, for example, gases called $NO_x$ (NOX) such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), and dinitrogen pentoxide ($N_2O_5$)

Sulfur oxides are compounds of sulfur and oxygen. The aforementioned sulfur oxides are, for example, gases called $SO_x$ (SOX) such as sulfur dioxide ($SO_2$) and sulfur trioxide ($SO_3$).

Sulfur fluorides are compounds of fluorine and sulfur. The aforementioned sulfur fluorides are, for example, disulfur difluoride (F—S—S—F, S=$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons containing one to eight carbon atoms. C3 to C8 hydrocarbons may be one of a linear-chain compound, a side-chain compound, and a cyclic compound. C2 to C8 hydrocarbons may also be either saturated hydrocarbons (i.e., the absence of double bonds and triple bonds in molecules) or unsaturated hydrocarbons (i.e., the presence of double bonds and/or triple bonds in molecules). C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), and isobutene ($CH_2$=$C(CH_3)_2$).

The aforementioned organic acids are, for example, carboxylic acids or sulfonic acids. Examples of carboxylic acids include formic acids ($CH_2O_2$), acetic acids ($C_2H_4O_2$), oxalic acids ($C_2H_2O_4$), acrylic acids ($C_3H_4O_2$), and benzoic acids ($C_6H_5COOH$). The sulfonic acids are, for example, ethane sulfonic acids ($C_2H_6O_3S$). The organic acids may be chain compounds, or may be cyclic compounds.

The aforementioned alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

The mercaptans are organic compounds with hydrogenated sulfur (SH) at their terminals and are substances called also thiol or thioalcohol. The aforementioned mercaptans are, for example, methyl mercaptans ($CH_3SH$), ethyl mercaptans ($C_2H_5SH$), and 1-propane thiols ($C_3H_7SH$).

The aforementioned ester is, for example, formic acid ester or acetic acid ester.

The aforementioned ether is, for example, dimethyl ether (($CH_3)_2O$), methyl ethyl ether ($C_2H_5OCH_3$), or diethyl ether (($C_2H_5)_2O$).

The aforementioned ketone is, for example, acetone (($CH_3)_2CO$), methyl ethyl ketone ($C_2H_5COCH_3$), or diethyl ketone (($C_2H_5)_2CO$).

The aforementioned aldehyde is, for example, acetaldehyde ($CH_3CHO$), propionaldehyde ($C_2H_5CHO$), or butanal (butyraldehyde) ($C_3H_7CHO$).

The following description takes the example of the case where the mixture of substances separated by the separation apparatus 2 is a mixed gas including a plurality of types of gases.

The separation apparatus 2 includes the zeolite membrane complex 1, sealing parts 21, an outer casing 22, two seal members 23, a supply part 26, a first recovery part 27, and a second recovery part 28. The zeolite membrane complex 1, the sealing parts 21, and the seal members 23 are housed in the outer casing 22. The supply part 26, the first recovery part 27, and the second recovery part 28 are disposed outside the outer casing 22 and connected to the outer casing 22.

The sealing parts 21 are members mounted on the opposite ends of the support 11 in the longitudinal direction (i.e., left-right direction in FIG. 5) and for covering and sealing the opposite end faces of the support 11 in the longitudinal direction and the outer side faces in the vicinity of the opposite end faces. The sealing parts 21 prevent the inflow and outflow of gases through the opposite end faces of the support 11. The sealing parts 21 are, for example, plate-like members formed of glass or a resin. The material and shape of each sealing part 21 may be appropriately changed. Note that the sealing parts 21 have a plurality of openings overlapping the through holes 111 of the support 11, so that the opposite ends of each through hole 111 of the support 11 in the longitudinal direction are not covered by the sealing parts 21. This allows the inflow and outflow of gases or the like from these opposite ends into the through holes 111.

The outer casing 22 is a tubular member of a substantially circular cylindrical shape. The outer casing 22 is formed of, for example, stainless steel or carbon steel. The longitudinal direction of the outer casing 22 is substantially parallel to the longitudinal direction of the zeolite membrane complex 1. One end of the outer casing 22 in the longitudinal direction (i.e., left-side end in FIG. 5) has a supply port 221, and the other end thereof has a first exhaust port 222. A side face of the outer casing 22 has a second exhaust port 223. The supply port 221 is connected to the supply part 26. The first exhaust port 222 is connected to the first recovery part 27. The second exhaust port 223 is connected to the second recovery part 28. The internal space of the outer casing 22 is an enclosed space isolated from the space around the outer casing 22.

The two seal members 23 are disposed around the entire circumference between the outer side face of the zeolite membrane complex 1 and the inner side face of the outer casing 22 in the vicinity of the opposite ends of the zeolite membrane complex 1 in the longitudinal direction. Each seal member 23 is a substantially circular ring-shaped member formed of a material impermeable to gases. For example, the seal members 23 are 0 rings formed of a resin having flexibility. The seal members 23 are in intimate contact with the outer side face of the zeolite membrane complex 1 and the inner side face of the outer casing 22 around the entire circumference. In the example illustrated in FIG. 5, each seal member 23 is in intimate contact with an outer side face of the sealing part 21 and in intimate contact indirectly with the outer side face of the zeolite membrane complex 1 via the sealing part 21. The space between the seal member 23 and the outer side face of the zeolite membrane complex 1 and the space between the seal member 23 and the inner side face of the outer casing 22 are sealed so as to almost or completely disable the passage of gases.

The supply part 26 supplies a mixed gas to the internal space of the outer casing 22 through the supply port 221. For example, the supply part 26 is a blower or pump that transmits the mixed gas under pressure toward the outer casing 22. The blower or pump includes a pressure regulator that regulates the pressure of the mixed gas supplied to the outer casing 22. The first recovery part 27 and the second recovery part 28 are, for example, reservoirs for storing gases derived from the outer casing 22, or they are blowers or pumps that transmit gases.

In the separation of the mixed gas, the aforementioned separation apparatus 2 is provided to prepare the zeolite membrane complex 1 (step S21). Then, the mixed gas including a plurality of types of gases having different permeability to the zeolite membrane 12 is supplied from the supply part 26 to the internal space of the outer casing 22. For example, the mixed gas is composed primarily of $CO_2$ and $CH_4$. The mixed gas may contain gases other than $CO_2$ and $CH_4$. The pressure (i.e., initial pressure) of the mixed gas supplied from the supply part 26 to the internal space of the outer casing 22 is in the range of, for example, 0.1 MPa to 20.0 MPa. The temperature at the time of separating the mixed gas is in the range of, for example, 10° C. to 150° C.

The mixed gas supplied from the supply part 26 to the outer casing 22 is introduced from the left end of the zeolite membrane complex 1 in the drawing into each through hole 111 of the support 11 as indicated by an arrow 251. A gas having high permeability (e.g., $CO_2$; hereinafter referred to as a "high-permeability substance") in the mixed gas passes through the zeolite membrane 12 provided on the inner side face of each through hole 111 and the support 11, and is emitted from the outer side face of the support 11. In this way, high-permeability substances are separated from gases with low permeability (e.g., $CH_4$; hereinafter referred to as a "low-permeability substance") in the mixed gas (step S22). The gas (hereinafter referred to as a "permeable substance") emitted from the outer side face of the support 11 is recovered by the second recovery part 28 through the second exhaust port 223 as indicated by an arrow 253. The pressure (i.e., permeation pressure) of the gas recovered by the second recovery part 28 through the second exhaust port 223 is, for example, approximately one atmospheric pressure (0.101 MPa).

In the mixed gas, gases (hereinafter, referred to as "impermeable substances") other than the gas that has passed through the zeolite membrane 12 and the support 11 pass through each through hole 111 of the support 11 from the left side to the right side in the drawing and is recovered by the first recovery part 27 through the first exhaust port 222 as indicated by an arrow 252. The pressure of the gases recovered by the first recovery part 27 through the first exhaust port 222 is, for example, substantially the same pressure as the initial pressure. In addition to the aforementioned low-permeability substances, the impermeable substances may include high-permeability substances that did not pass through the zeolite membrane 12.

Figure 7:
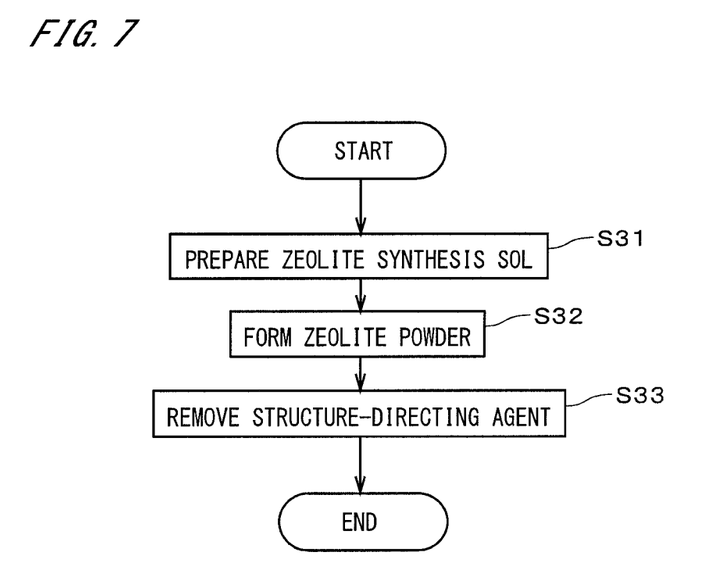
FIG. 7 is a flowchart of production of zeolite powder.

Next, the production of zeolite powder using the above-described zeolite synthesis sol 8 will be described. FIG. 7 is a flowchart of the production of zeolite powder. First, the zeolite synthesis sol 8 is prepared in the same manner as in step S12 described above with reference to FIG. 3 (step S31). As described previously, the zeolite synthesis sol 8 includes the particles 81 of an aluminum source and the solvent 82 in which the particles 81 are dispersed. The mean particle diameter of the particles 81 is in the range of 5 to 500 nm. The solvent 82 is water that contains a phosphorus source, an SDA, and a carboxylic acid.

Then, the zeolite synthesis sol 8 is subjected to hydrothermal synthesis. The temperature at the time of the hydrothermal synthesis is in the range of, for example, 120 to 200° C. The hydrothermal synthesis time is in the range of, for example, 5 to 240 hours. In the zeolite synthesis sol 8, as described previously, the particles 81 of the aluminum source are favorably dispersed in the solvent 82. In the hydrothermal synthesis, zeolite is uniformly crystallized in the solvent 82 and forms zeolite powder (step S32). When the hydrothermal synthesis is completed, the obtained crystals are cleaned with deionized water. The cleaned crystals are then dried at, for example, 100° C. so as to acquire zeolite powder. The composition of the zeolite powder can be adjusted by adjusting, for example, the composition ratio of the aluminum source and the phosphorus source in the zeolite synthesis sol 8.

Thereafter, the zeolite powder is subjected to heat treatment in an oxidizing gas atmosphere in order to burn and remove the SDA in the powder (step S33). Preferably, the SDA is removed almost completely. The heating temperature at the time of the removal of the SDA is in the range of, for example, 300 to 700° C. The heating time is in the range of, for example, 5 to 200 hours.

Through the above-described processing, the zeolite powder is obtained. In the production of zeolite powder using the zeolite synthesis sol 8, it is possible to easily obtain the zeolite powder that contains aluminum and phosphorus and has a uniform particle diameter (sharp particle-size distribution).

The zeolite synthesis sol 8, the zeolite membrane 12, the zeolite membrane complex 1, and the zeolite powder described above may be modified in various ways.

The zeolite synthesis sol 8 may contain particles other than the particles 81 of the aluminum source. The particles 81 may contain substances other than the aluminum source. The solvent 82 may contain substances other than the phosphorus source, the SDA, and the carboxylic acid.

Depending on the application of the zeolite membrane 12 and the zeolite powder, the zeolite membrane 12 and the zeolite powder may contain an SDA. That is, the step of removing the SDA (steps S14 and S33) may be omitted in the production of the zeolite membrane 12 and the zeolite powder.

The zeolite membrane complex 1 may further include a functional membrane or a protective membrane laminated on the zeolite membrane 12, in addition to the support 11 and the zeolite membrane 12. Such a functional or protective membrane may be an inorganic membrane such as a zeolite membrane, a silica membrane, or a carbon membrane, or may be an organic membrane such as a polyimide membrane or a silicone membrane. Alternatively, a substance that can easily adsorb specific molecules such as $CO_2$ may be added to the functional or protective membrane laminated on the zeolite membrane 12.

The separation apparatus 2 including the zeolite membrane complex 1 may separate substances other than the substance exemplified in the above description from the mixture of substances.

The configurations of the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The zeolite synthesis sol according to the present invention can be used in the synthesis of various types of zeolite. For example, a zeolite membrane can be used as a gas separator membrane, and can also be used as a separator membrane for substances other than gases or as an adsorbent membrane for various substances in various fields. The zeolite powder can also be used in various applications.

REFERENCE SIGNS LIST

8 Zeolite synthesis sol
11 Support
12 Zeolite membrane
81 Particles
82 Solvent
S11 to S14, S21, S22, S31 to S33 Step

The invention claimed is:

1. A zeolite synthesis sol comprising:
   particles of an aluminum source with a mean particle diameter of 5 to 500 nm, said particles being particles of crystalline alumina, amorphous alumina, boehmite, pseudoboehmite, or aluminum hydroxide; and
   a solvent in which said particles are dispersed, said solvent being water that contains a phosphorus source, a structure-directing agent, and a carboxylic acid;
   wherein said zeolite synthesis sol is in liquid form.

2. The zeolite synthesis sol according to claim 1, having a phosphorus/aluminum molar ratio of 0.8 to 4.

3. The zeolite synthesis sol according to claim 1, having a pH of 4 to 11.

4. The zeolite synthesis sol according to claim 1, having a carboxylic acid/aluminum molar ratio of 0.01 to 3.

5. A method of producing a zeolite membrane, comprising:
   preparing the zeolite synthesis sol according to claim 1; and
   forming a zeolite membrane on a support through hydrothermal synthesis using said zeolite synthesis sol.

6. A method of producing zeolite powder, comprising:
   preparing the zeolite synthesis sol according to claim 1; and
   forming zeolite powder through hydrothermal synthesis using said zeolite synthesis sol.

7. The zeolite synthesis sol according to claim 1, wherein said particles of said aluminum source are particles of alumina or aluminum hydroxide.

* * * * *